United States Patent [19]

Hibbard

[11] Patent Number: 5,236,272

[45] Date of Patent: Aug. 17, 1993

[54] MOUNTING APPARATUS FOR ROTATABLE OPTICAL DISK

[75] Inventor: Richard L. Hibbard, Rochester, N.Y.

[73] Assignee: Eastman Kodak Company, Rochester, N.Y.

[21] Appl. No.: 708,428

[22] Filed: May 31, 1991

[51] Int. Cl.$^5$ ............................................. F16B 1/00
[52] U.S. Cl. .................................. 403/24; 403/259; 403/260; 411/368; 411/542; 411/544; 411/915
[58] Field of Search ................. 403/24, 259, 260, 261, 403/258; 411/368, 369, 370, 542, 544, 915

[56] References Cited

U.S. PATENT DOCUMENTS

| | | | |
|---|---|---|---|
| 706,265 | 8/1902 | Smalley | 403/259 |
| 722,061 | 3/1903 | Waldo, Jr. | |
| 1,489,885 | 4/1924 | Gore | |
| 1,735,926 | 11/1929 | Jandus | |
| 2,132,950 | 10/1938 | Green | |
| 2,260,610 | 10/1941 | Lucci | |
| 2,562,327 | 7/1951 | Moore | |
| 2,741,843 | 4/1956 | Sejman et al. | |
| 2,769,333 | 11/1956 | Reintjes | |
| 3,096,678 | 7/1963 | Devine et al. | 411/339 X |
| 3,181,899 | 5/1965 | McKnight, Jr. | 411/369 X |
| 3,471,184 | 10/1969 | Herczeg | 403/261 |
| 3,868,732 | 3/1975 | Englehart | 4/172 |
| 3,871,785 | 3/1975 | Murvall | 403/259 |
| 3,899,257 | 8/1975 | Gladieux | 403/260 X |
| 3,973,789 | 10/1976 | Kunz et al. | 403/259 X |
| 4,004,301 | 1/1977 | Kaufman | |
| 4,035,874 | 7/1977 | Liljendahl | 24/90 |
| 4,245,438 | 1/1981 | van Buren, Jr. | 403/259 X |
| 4,295,753 | 10/1981 | Luerken et al. | 403/259 X |
| 4,411,549 | 10/1983 | Sheppard | 403/258 |
| 4,431,092 | 2/1984 | Kloster | 188/321 |
| 4,858,880 | 8/1989 | Durand | 411/542 X |
| 4,955,744 | 9/1990 | Barth et al. | 403/259 |
| 4,957,403 | 9/1990 | Corain et al. | |

FOREIGN PATENT DOCUMENTS

| | | | |
|---|---|---|---|
| 0064540 | 2/1913 | Canada | 411/339 |
| 561212 | 8/1958 | Canada | 403/259 |
| 1108867 | 1/1956 | France | 411/369 |

Primary Examiner—Leslie A. Braun
Assistant Examiner—Andrea Pitts
Attorney, Agent, or Firm—Mark Z. Dudley

[57] ABSTRACT

Apparatus for mounting an optical disc whereby the yield strength of the disk is maintained. An upper section includes an end cap having a central bore, a deformable annular finger section, and a compression face for receiving a deformable O-ring. A lower section includes an insert having a cylindrical axial projection about which a deformable washer may be fitted. As the upper and lower sections are secured in the central aperture of the optical disk, the disk is captured between the finger section, O-ring, and washer.

14 Claims, 7 Drawing Sheets

MOUNTING APPARATUS FOR ROTATABLE OPTICAL DISK

BACKGROUND OF THE INVENTION

1. Field of the Invention

The invention relates to apparatus for mounting a rotatable optical disk.

2. Description of the Prior Art

Planar rotatable disks are used to great advantage in various optical systems. For example, rotatable holographic disks known as a hologons are employed in a class of optical instruments known as beam scanners. The hologon is located in the path of a light beam and is spun at a high rate; the beam is thereby caused to deflect in a scanning motion.

Rotatable optical disks are also used as media for storing information. For example, storage systems that employ optically-based writing and reading apparatus are known as optical memories. An optical disk is spun in the path of a writing apparatus. The information to be recorded is used to alter one or more of the structural or electromagnetic properties of the disk. The disk may thereafter be read by again spinning it in proximity to a reading apparatus.

Glass is the material of choice for constructing many of the disks used in optical disk systems. The disk may be composed entirely of glass or the disk may comprise a glass substrate to which one of various surface coatings have been applied. The choice of glass for constructing optical disks is founded on several optical and structural properties that are well known in the art.

One property in particular, the yield strength of the optical disk, is pertinent to the present invention. Glass is inherently a very strong material: researchers have reported tensile strengths well in excess of 40,000 psi for pristine glass fibers that are protected from all adverse environmental influences. Unfortunately, the strength of glass in practice is 10–100 times lower than that of its pristine condition. The yield strength of an object formed from glass, such as an optical disk, is therefore but a small fraction of the aforementioned tensile strength figure because of stress concentrations introduced by surface defects.

These defects, which are have been termed Griffith flaws, usually occur in the form of small surface microcracks. These microfractures arise due to accidental mechanical damage that occurs during manufacture, processing, and use (cf. Ernsberger, F.M., *Advances in Glass Technology*. Part 1, pp. 511-524, Plenum Press, New York (1962); and Griffith, A.A., *Philos. Trans. R. Soc.*, 221A, 163 (1921)). An applied load causes stresses in the vicinity of the crack tip. Fracture occurs on an atomic level when the bonds between the glass atoms are stretched past the breaking point.

When a glass optical disk is rotated at a spin rate that is roughly in excess of 1,000 r.p.m., the disk is subjected to extreme stress induced by centrifugal force. Unfortunately, at such a high spin rate, the disk's ability to withstand the stress can be exceeded and the disk will fail (fracture). Failure occurs because the glass optical disks is characteristically unable to yield to the localized points of high stress concentration. That is, the disk yield strength is insufficient due to surface imperfections such as a one or more microfractures.

There are two conventional approaches by which practitioners of the prior art have attempted to preserve the high intrinsic yield strength of glass optical disks. First, the glass can be created with a flawless surface and thereafter the surface must be protected from damage. This may be done by acid polishing in a hydrofluoric acid solution and then protecting the glass with a plastic film. Usually this is impractical because of the expense and because some of the most outstanding advantages of glass, such as its optical clarity, are lost.

The second approach takes advantage of the fact that disk failure is always the result of tensile stresses. If the glass is pre-stressed so as to put the surface in compression, the resulting compressive stress has to be overcome before tensile stresses are encountered. Glass is categorically defined as an amorphous solid and is a product of fusion that has cooled to a rigid condition without crystallizing. Pre-stressing is achieved by quenching the glass from a softened condition so that the surface solidifies first. The core of the glass cools more slowly and in doing so it contracts and pulls the already rigid surfaces into compression. However, this approach can cause undesirable optical distortion of the disk.

Glass may also be strengthened by one of several chemical ion exchange processes. Typically ion exchange strengthening is carried out in molten salt baths. This is known as chemical strengthening, and it has the advantage that almost no distortion occurs as the result of the strengthening. Chemically-strengthened glass optical disks are therefore preferred over thermally-tempered glass optical disks, which invariably have some distortion. However, both processes are costly and complex. Special glass compositions, for example, must be formulated for chemical processing. Most chemically-strengthened glasses are derived from soda-aluminosilicate composition developed especially for chemical strengthening.

Furthermore, there is a need in some applications, such as in high-rate beam scanning apparatus, to rotate an optical disk beyond the safe revolution rate of a even the best chemically- or thermally-strengthened glass optical disks. Chemically-strengthened glass disks have been rotated (spun) at spin rates in excess of 20,000 r.p.m., whereupon the disks have failed dramatically (i.e., exploded) under the influence of the extreme centrifugal stress.

SUMMARY OF THE INVENTION

In developing my disk mounting apparatus, I have discovered several causes of stress-induced disk failure during high speed rotation of the disk. One cause of failure is the set of abrasions and indentations exerted on the disk surface by debris (dust, shavings, or other particles) that are trapped between the conventional disk mounting apparatus and the disk. Another is the localized stress imparted by irregularities (bumps, burrs, and the like) on the surface of the conventional disk mounting apparatus that impinge upon the disk surface, which can lead to microfractures. A similar cause is the localized stress suffered at the disk surface when a rigid mounting apparatus cannot accommodate a bump or other protrusion on the surface of the disk.

I have accordingly devised a disk mount for "soft-mounting" the disk that obviates the occurrence of the aforementioned surface microfractures that are caused by conventional disk mounting apparatus. The contemplated apparatus allows an optical disk to be securely mounted for high-rate rotation whereby the yield strength of the disk is not compromised by the mounting apparatus. A glass optical disk that is not composed of thermally- or chemically-strengthened glass can then withstand the greater stresses experienced at a high spin rate; a strengthened glass disk is correspondingly able to withstand still higher stresses. The useable spin rate of a glass optical disk, if mounted in the contemplated disk mount, is then increased beyond those rates heretofore thought possible.

In addition, the contemplated disk mount coaxially centers the disk on the disk mount during the mounting operation, and the plane of the disk is made precisely perpendicular to the axis of rotation of the disk and disk mount assembly. The optical performance of the disk and the dynamic balance of the disk and disk mount assembly is thereby improved. The contemplated disk mount is simple and inexpensive to fabricate and is easy to use.

Accordingly, in one preferred embodiment of an apparatus for mounting a rotatable optical disk, there is included first compression means having a central bore and a first compression face located circumjacent the central bore, and second compression means having an axial projection extending therefrom, the axial projection being adapted for coaxial engagement of the central bore, and a second compression face circumjacent the projection. Deformable means is locatable between the first compression face and the upper surface, between the axial projection and the central aperture, and between the second compression face and the lower surface of the optical disk. By virtue of the deformable means, the upper and lower sections are coaxially locatable with respect to the axis of rotation of the optical disk, and the deformable means is also operable to frictionally capture the optical disk at the upper and lower surfaces.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings.

DETAILED DESCRIPTION OF THE PREFERRED EMBODIMENTS

Figure 1:
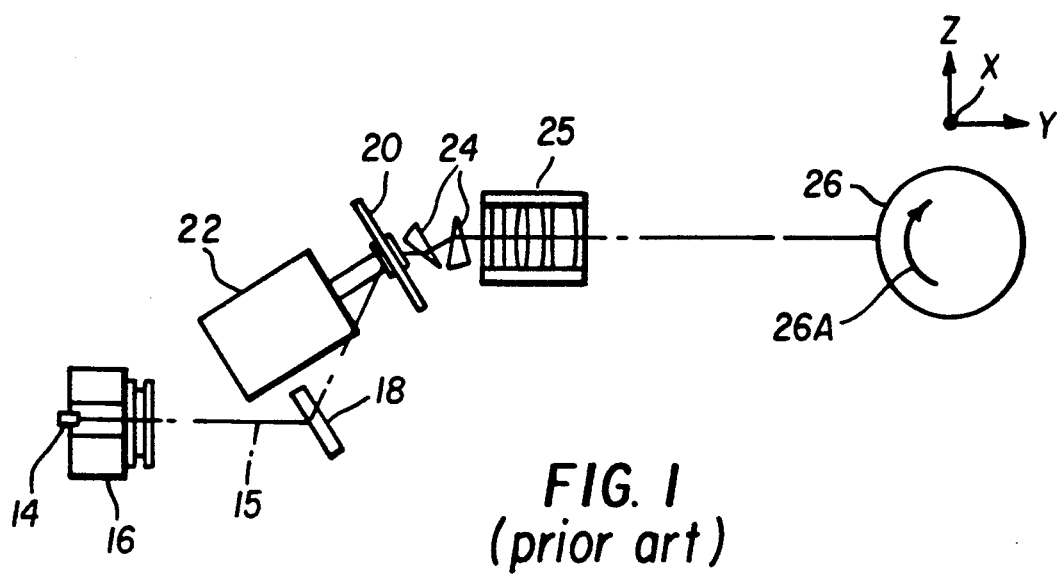
FIG. 1 is a side schematic view of a conventional beam scanning apparatus.

With reference to FIG. 1, it will be appreciated that the invention to be described herein will have great utility in mounting a glass optical disk in a beam scanning apparatus. However, a disk mounting apparatus constructed according to our invention need not be limited to only glass disk and beam scanning applications. Rotatable disks formed of other stress-fracturable media, for use in beam scanners or other rotating disk systems, will benefit from this invention.

Therefore, although the present invention is contemplated for use with glass optical disks, it is believed that the present invention offers great advantages in the handling of disks and other rotatable members formed from materials, other than glass, that are subject to stress-induced fracture at surface imperfections. For example, although they are not as widely used for optical products, compositions known as glass-ceramics may benefit from the practice of the present invention.

Referring now to FIG. 1, there is illustrated a rotatable optical disk apparatus in which the present invention may be usefully applied. A laser beam source 14 is provided for generating a laser beam 15 that passes through beam collimating optics 16 and a stationary diffraction grating 18. These optical means direct the beam to a rotatable optical disk 20 which typically includes a holographic grating and thus is sometimes referred to as a hologon. The optical disk is comprised of a plurality of holographically produced diffraction grating facets 36 (cf. FIG. 2) which cause beam 15 to be scanned in a nominally horizontal direction as the spinner 20 is rotationally driven by a high speed motor 22. The scanning beam 15 then passes through a pair of prisms 24 which serve as anamorphic optics for expanding the beam cross section dimension in the vertical or cross scan direction. The shaped, scanned beam 15 then passes through an f-Θ lens 25 which serves to focus the scanning beam onto a target represented by rotating drum 26.

Rotation of the disk 20 causes beam to deflect in a horizontal scanning (x-axis) direction on the surface of drum 26, along a line normal to the plane of the drawing while the vertical or cross scanning of the beam in the z-axis direction is achieved by rotation of the drum in the direction of arrow 26A to thus generate a two-dimensional raster scan.

Figure 2A:
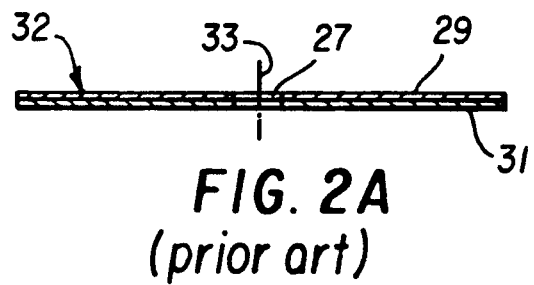
FIGS. 2A and 2B are side sectional and plan views, respectively, of a conventional optical disk usable in the beam scanning apparatus of FIG. 1.
Figure 2B:
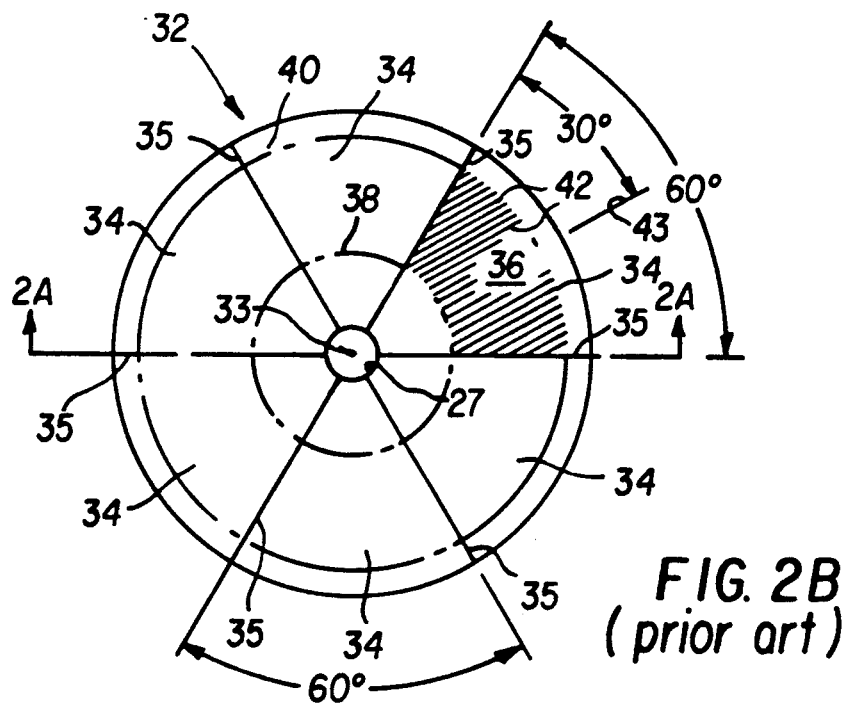

With reference to FIGS. 2A and 2B, the optical disk 20 will be discussed briefly. Holographic optical disks are constructed such that when they are positioned to intercept a stationary beam of light, such as from a laser diode, and rotated, the beam is defected in a scanning motion. Accordingly, an optical disk as contemplated in the present invention is most typically formed as a carrier substrate of glass and must be mountable for rotation about an axis of rotation at the center of the disk. The disk may be transparent or opaque depending on whether the holographic scanner spinner is of the transmission or reflection type. The disk may be regarded as divided onto a plurality of sector-shaped facets, that is, regions bounded by two radial lines extending radially from the axis of the disk and an arc concentric with the disk, the arc usually being a portion of the circular periphery of the disk. Each facet includes a diffraction grating pattern usually formed in a photoresist layer carried by the carrier substrate disk. Usually, in a multi-facet holographic optical disk, the diffraction grating pattern of a facet does not extend to the center of the disk. The diffraction grating pattern usually extends to the periphery of the disk or to a circle concentric with the disk and having a radius only slightly smaller than that of the disk. Thus, each diffraction grating pattern has usually had a shape bounded by parts of two radii and by inner and outer concentric arcs.

FIGS. 2A and 2B illustrate a known holographic optical disk 32 comprising a substrate carrier disk 31 of rigid material having thereon a coating 29 of photoresist material. The disk 31 has a central aperture 27, for cooperation with a mounting apparatus on an axis 33. The preferred embodiments of the present invention, to be described shortly, provide the desired mounting function with substantial improvement over the prior art. The disk has six facets 34, bounded by radial lines 35, each having an included angle of 60°. Each facet 34 includes a diffraction grating pattern 36 bounded by arcs of inner and outer circles 38 and 40, respectively, which are concentric with the disk 32. The diffraction lines 42 of one pattern are represented in FIG. 2, on a greatly enlarged scale, and are shown in one facet only. Lines 42 are parallel to the radius 43, although other arrangements of diffraction lines are known.

As thus far described, the construction and operation of beam scanners such as the system of FIG. 1, and holographic disks, such as that shown in FIGS. 2A and 2B, are generally known in the art and no further detailed discussion is considered necessary for an understanding of the present invention.

FIGS. 3 through 9 illustrate three embodiments of an optical disk mounting apparatus (hereinafter also referred to as a disk mount assembly, or simply disk mount) constructed according to the present invention. The contemplated embodiments of the disk mount are preferred for mounting the above-described holographic disk 36, or are suitable for mounting other optical disks in other systems.

Figure 4:
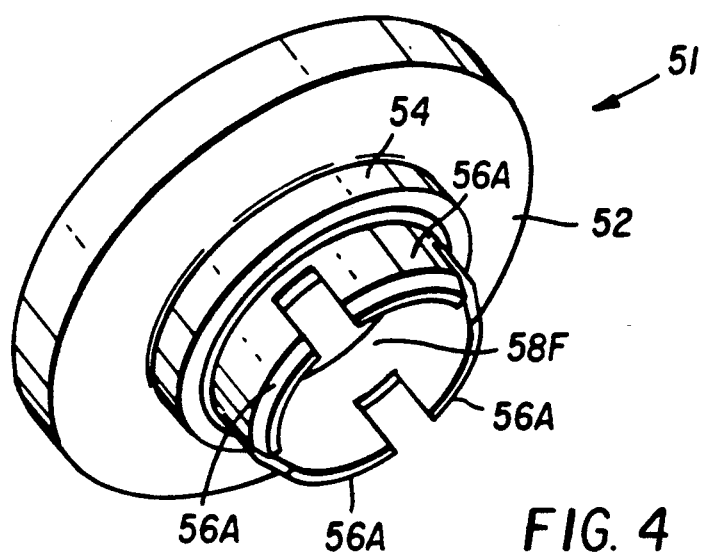
FIG. 4 is a side perspective view of an end cap useable in the disk mounting apparatus of FIG. 3.
Figure 3:
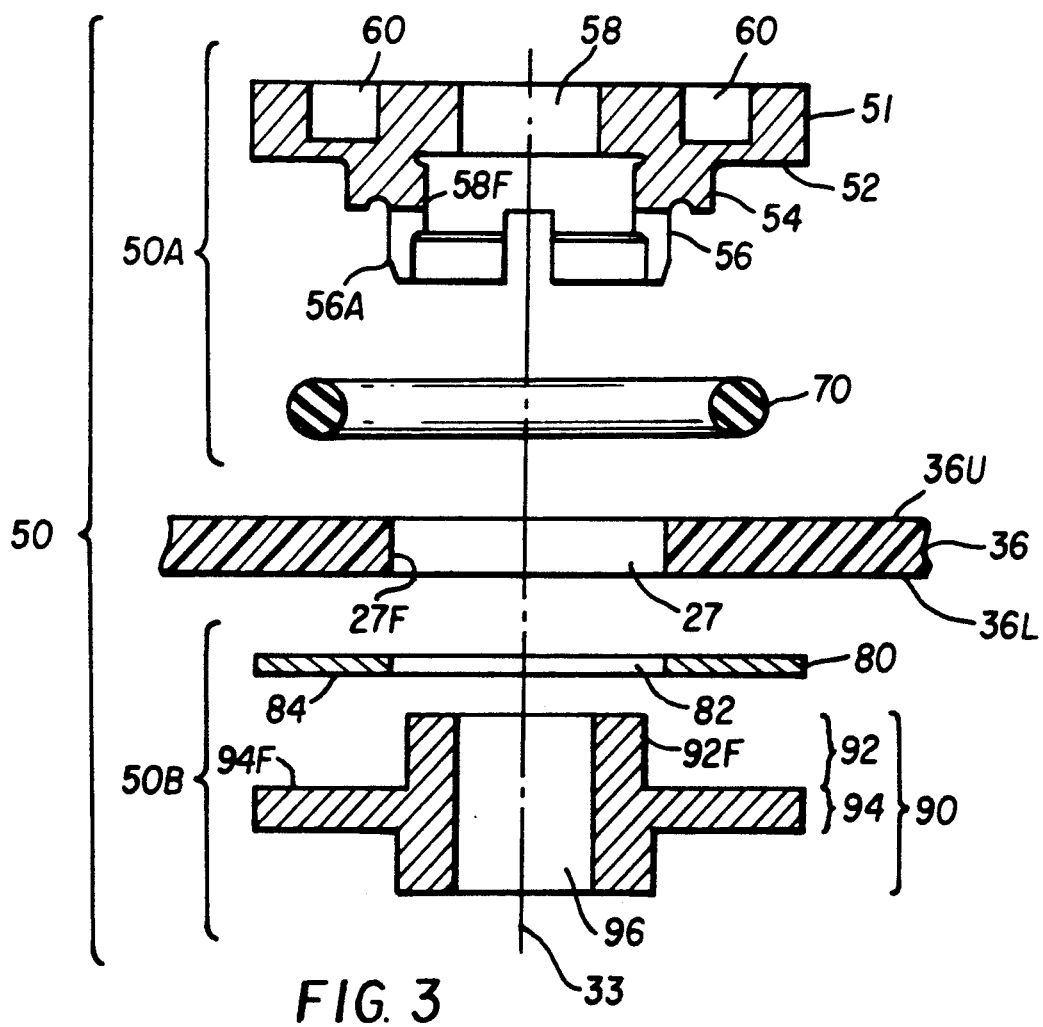
FIG. 3 is a side sectional view of a first preferred embodiment of an optical disk mounting apparatus, constructed according to the present invention, that is suitable for use in a beam scanning apparatus such a shown in FIG. 1.

As shown in FIGS. 3 and 4, a first preferred embodiment 50 of the optical disk mounting apparatus includes upper and lower sections 50A and 50B. The upper section 50A includes an end cap 51 having a planar compression face 52, flange 54, and an annular finger section 56 from which tab fingers 56A extend. A central bore 58 and threaded top holes 60 allow for attachment of the cap to other ancillary apparatus (not shown) as well be discussed shortly. A deformable O-ring 70 is sized to fit adjacent the flange 54 and on the compression face 52.

The lower section 50B includes a deformable washer 80 having a through-hole 82 which is sized to fit snugly on a threaded insert 90. That is, the diameter of the through-hole 82 is sized such that the washer 80 fits over the vertical face 92F of a central axial projection 92, and the lower surface 84 of the washer 80 is designed to lie on the compression face 94F of a shelf 94. The outer diameter of the vertical surface 92F is sized such that the vertical surface 92F will meet the inner vertical surface 58F of the end cap 50 when the upper and lower sections 50A and 50B are mounted on the optical disk and then seated together.

Therefore, the upper and lower sections 50A and 50B are preferably constructed such that the vertical surfaces 58F and 92F may be joined and fastened together by a chosen fastener means. Preferably, such means includes complimentary machine threads provided on the vertical surfaces 58F and 92F. Thus, after positioning the O-ring 70 on the end cap 50 and the washer 80 on the threaded insert 90, and the disk 36 on the washer 80, the machine threads on vertical surfaces 58F and 92F may be engaged as the insert 90 is rotated into the end cap 50. The optical disk is thereby frictionally captured between the upper and lower sections 50A and 50B when the threaded insert is fully seated in the end cap 50. The optical disk may thus be precisely rotated in a plane perpendicular to the axis of rotation 33, such that the upper and lower sections 50A and 50B and the disk 36 are rotatable as a unit. That is, the disk is captured such that the frictional force imposed on the disk by the O-ring 70 and washer 80 prevents the disk from slipping in the disk mount when rotated.

Alternatively, the surfaces 58F and 92F may each carry a layer of adhesive or a set of complimentary splines and grooves which snap together, or may be joined by other suitable means as are known in the fastener art. For example, the central bore 96 may be sized to fit a spindle clamp, bolt assembly, or other cylindrical apparatus (not shown) extendable through the central bores 58 and 96. The central bore 96 is also useable for receiving an axial bearing upon which the disk mount assembly may be positioned for rotation. Alternatively, the threaded top holes 60 are also useable for attaching the disk mount 50 to known drive apparatus so as to rotate the disk mount 50 and disk 36.

The end cap 50 is preferably formed of a substantially rigid material which nonetheless is subject to flexure in the finger section 56. The tabs 56A are subject to slight movement inward as the end cap 51 and 0-ring 70 are pressed onto the optical disk 36. The tabs 56A, being equidistant from the axis 33 and equally flexible, will thus snugly co-locate the end cap 50 and O-ring 70 to be precisely concentric with the central aperture 27 of the optical disk. The threaded insert 90 and washer 80 are then also made concentric with the end cap 50 and axis 33 when the upper and lower sections 50A and 50B are joined.

Further, it is important to note that as the upper and lower section 50A and 50B are joined, the tabs 56A are automatically interposed between the inner surface 27F of the optical disk central aperture 27 and the vertical surface 92F of the insert 90. The tabs 56A are therefore expected to be deformable at their surface so as to soft mount the inner surface 27F of the aperture 27. The 0-ring 70, being interposed between the upper surface of the optical disk 36U and the compression face 52 of the end cap 50, is compressed as the disk mount 50 is assembled. Similarly, the washer 80 is interposed and compressed between the lower surface of the optical disk 36L and the compression face 94F of the shelf 94. Thus, in capturing the optical disk, all surfaces of the disk 36 that meet any portion of the disk mount 50 are securely held by frictional forces, yet they are cushioned or "soft-mounted". This desirable result will thereby preclude the impingement of any particle, irregularity, or other small pressure point upon the disk with a force sufficient to cause a localized stress, abrasion, or other surface imperfection in the disk. The yield stress of the disk surface is therefore preserved.

The tabs 56, O-ring 70, and washer 80 are each accordingly formed from a material chosen for its capability for surface deformation. The material chosen for forming the O-ring 70 and the washer 80 also is chosen to provide a substantial coefficient of friction. These particular capabilities need only be present at the particular component surfaces that will contact the optical disk, although for simplicity the entire component may be formed of material having the requisite characteristics.

The end cap 51 is preferably formed of thermoplastic or thermoset composite base material, such as polycarbonate, that has various additive materials such as carbon for strength and other benefits. The O-ring is preferably formed of a resilient synthetic material or rubber; such formulations are well-known in the art. The washer 80 is preferably formed of a resilient synthetic material, such as the formulation commercially available in sheet form as Iso-Damp C-1002-01, by E.A.R. Specialty Composites Corporation, Indianapolis, Ind.

Figure 5:
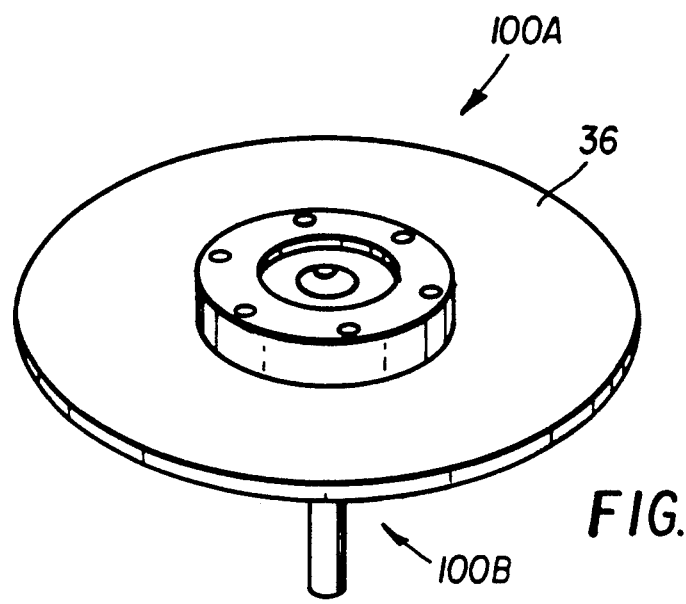
FIG. 5 is a side perspective view of a second preferred embodiment of an optical disk mounting apparatus construct according to the present invention.
Figure 6:
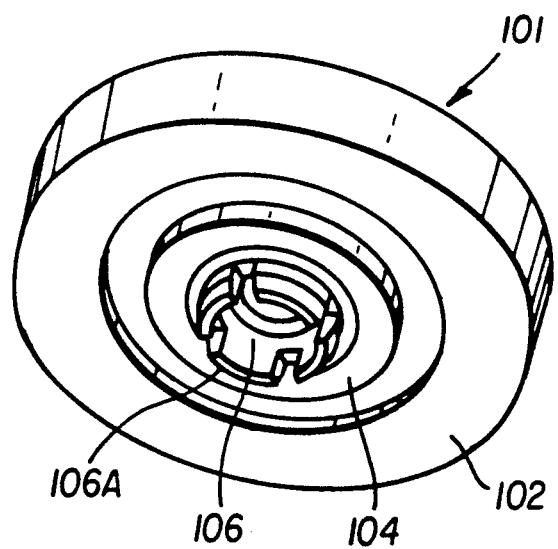
FIG. 6 is a side perspective view of the end cap in the mounting apparatus of FIG. 5.
Figure 7A:
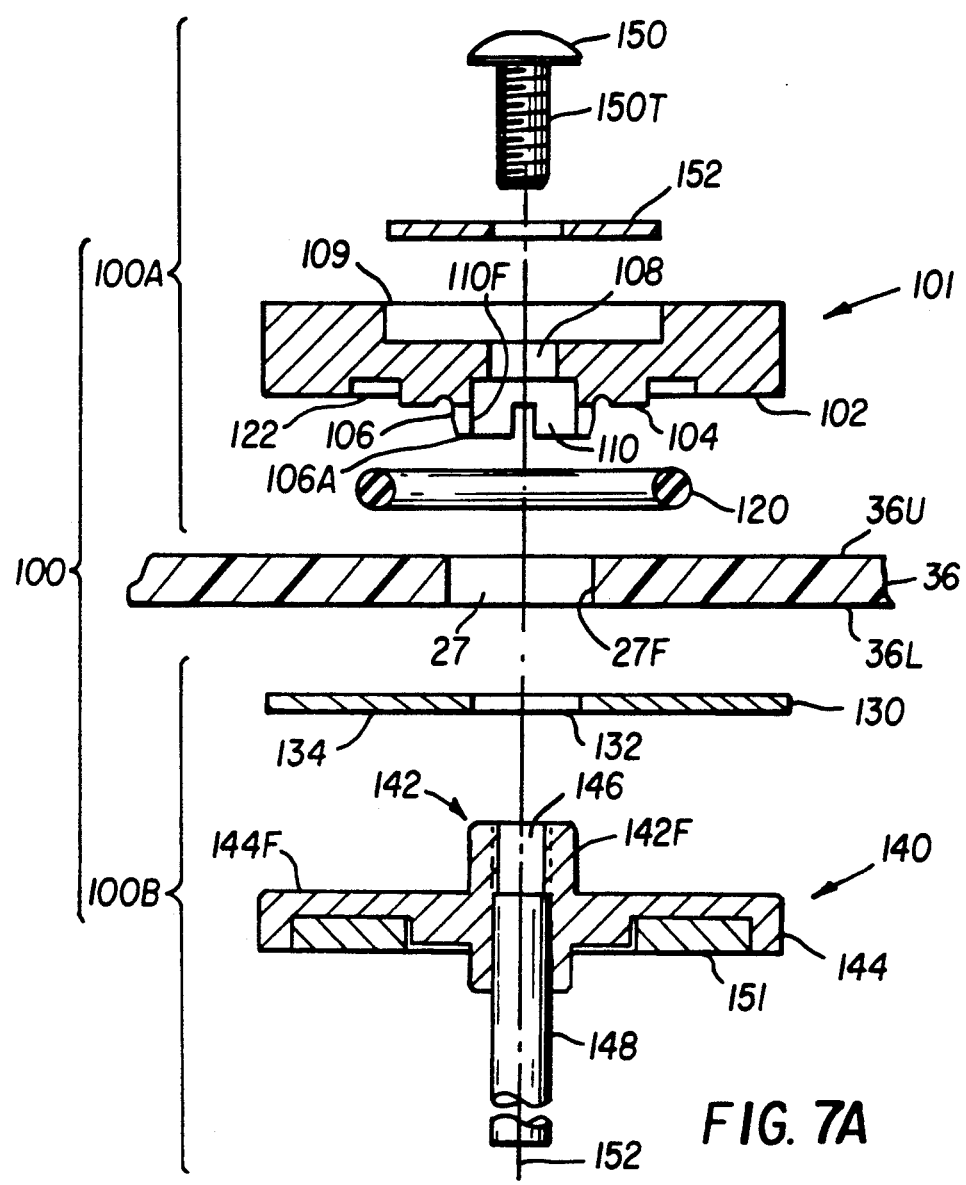
FIGS. 7A and 7B are exploded side sectional and underside views, respectively, of the disk mount of FIG. 5.
Figure 7B:
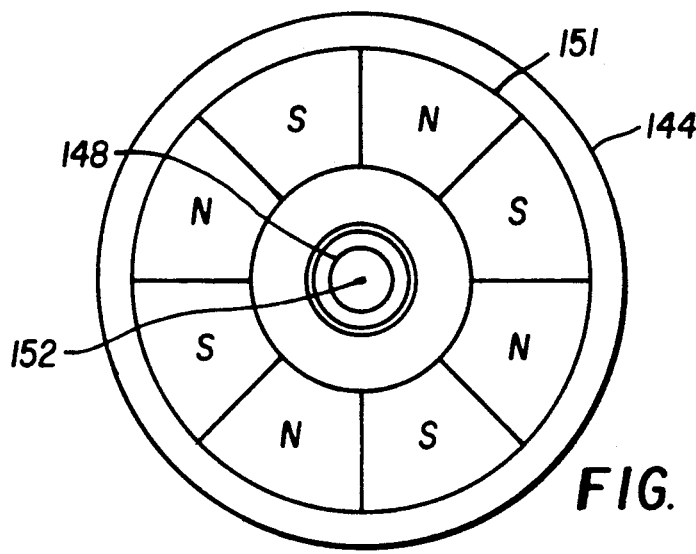
Figure 7C:
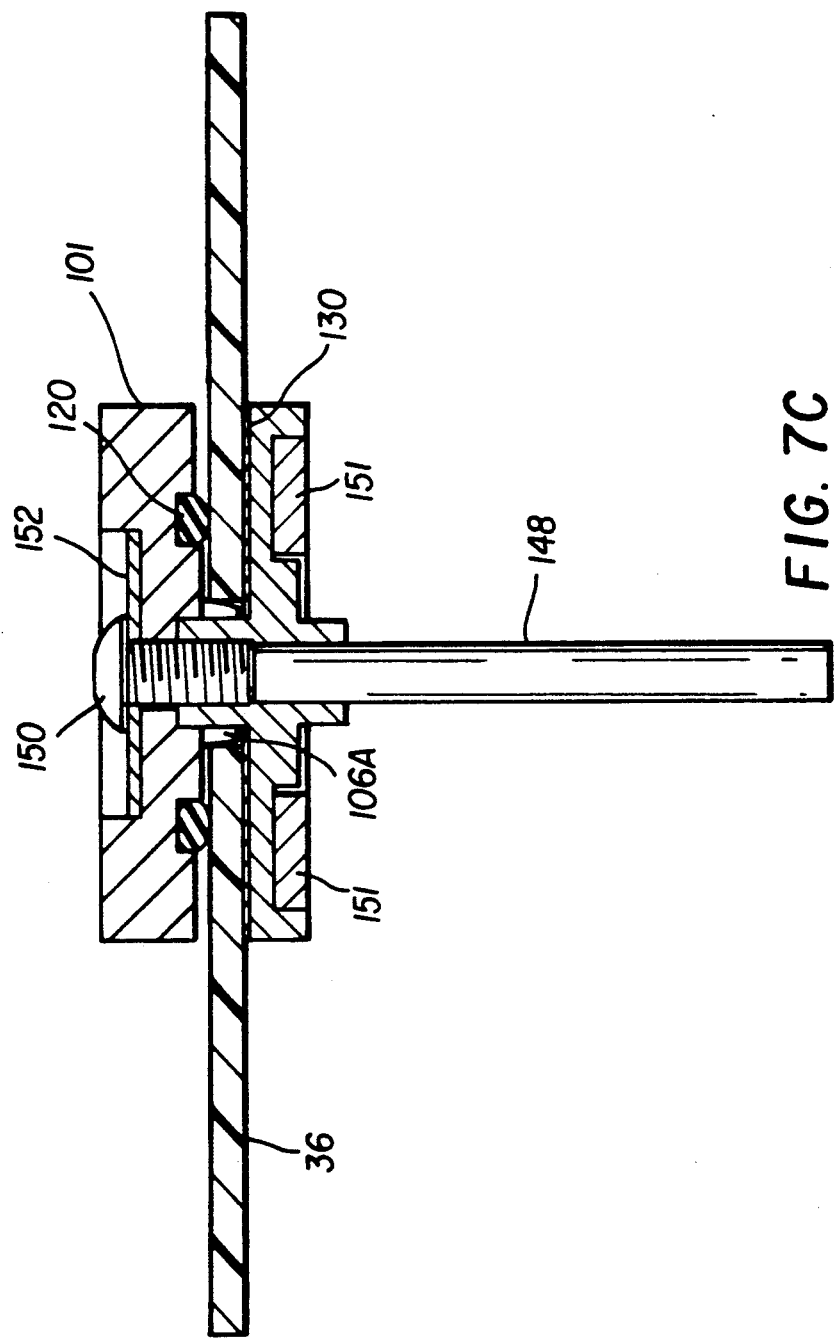
FIG. 7C is a side sectional view similar to that of FIG. 7A but of the disk mount assembled on an optical disk.
Figure 8:
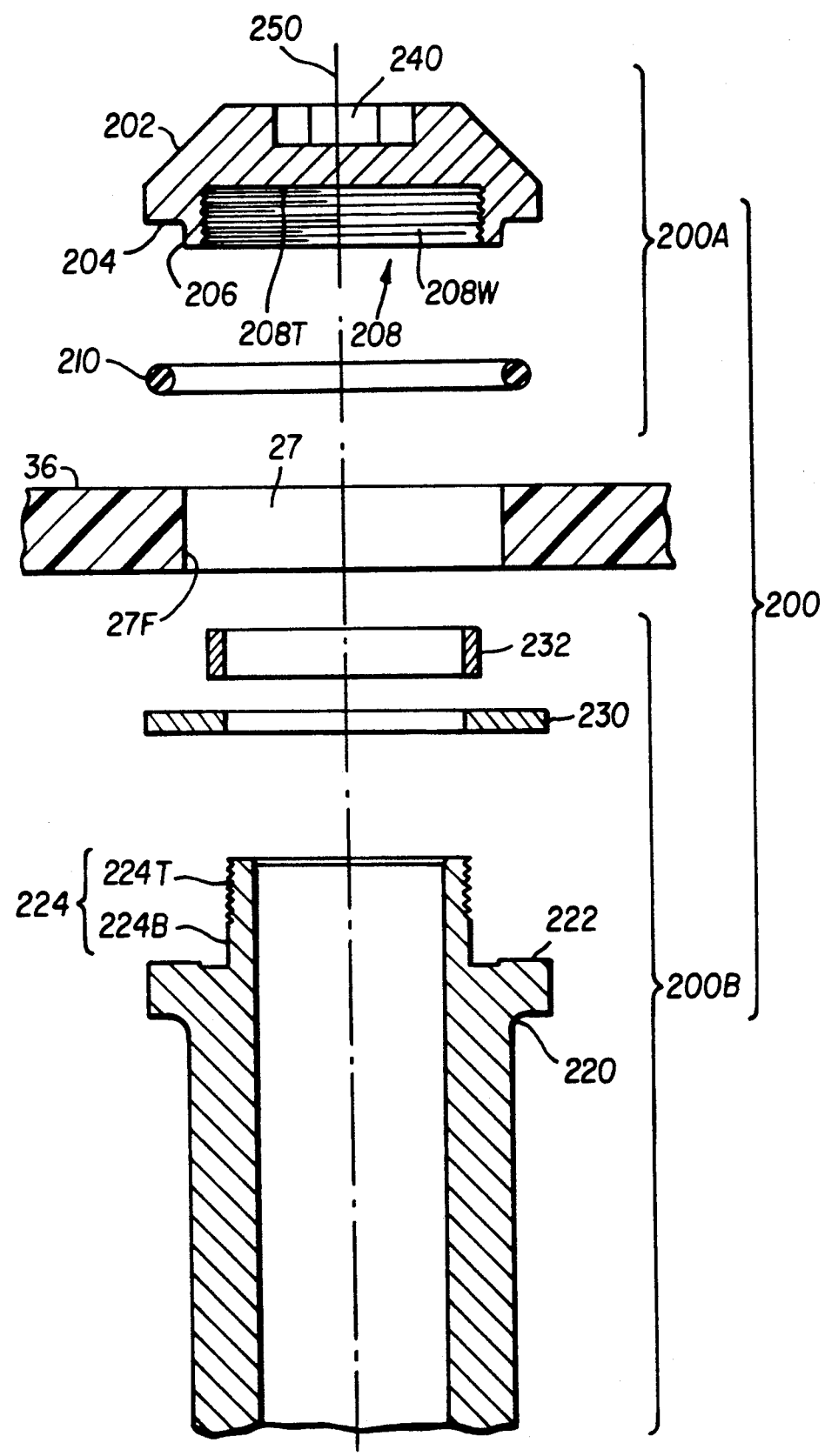
FIG. 8 is an exploded side perspective view of a third preferred embodiment of an optical disk mounting apparatus constructed according to the present invention.
Figure 9A:
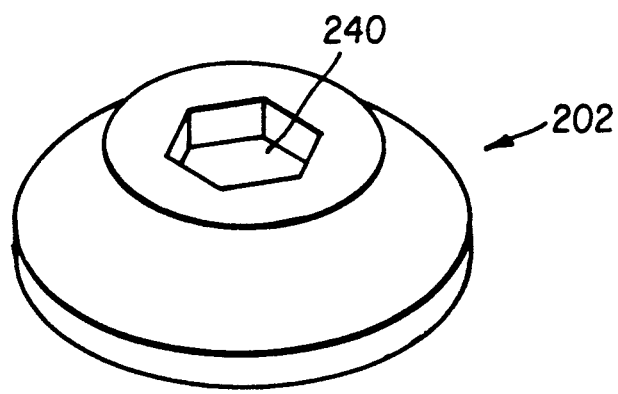
FIGS. 9A, 9B, and 9C are perspective, plan, and underside views of an end cap useable in the mounting apparatus of FIG. 8.
Figure 9B:
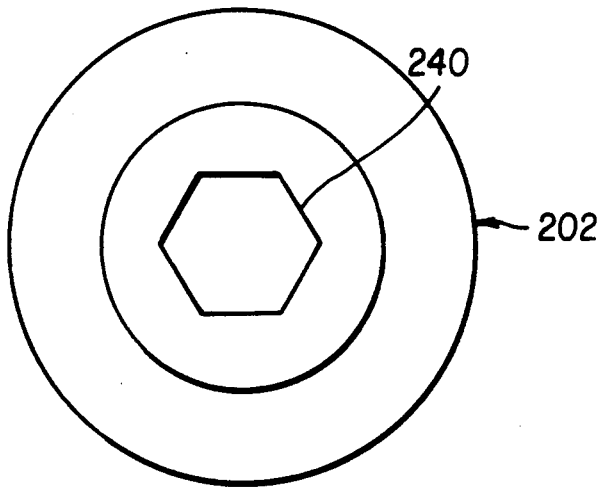
Figure 9C:
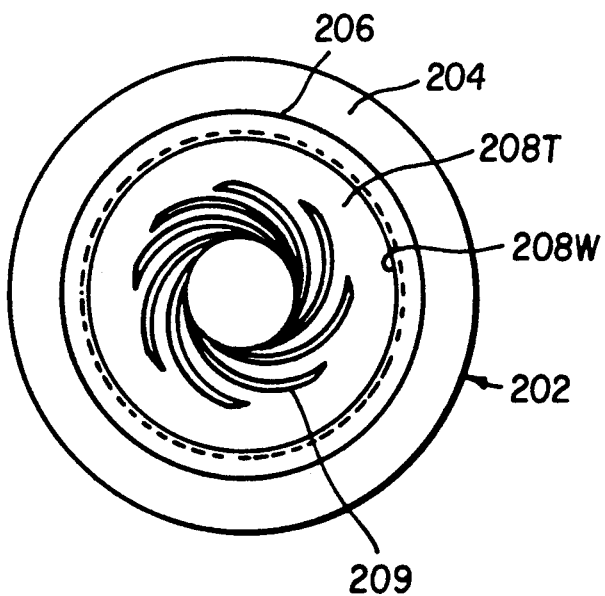

As shown in FIGS. 5, 6, and 7, a second preferred embodiment 100 of a disk mount may be constructed according to the invention. The second preferred embodiment 100 includes upper and lower sections 100A and 100B. The upper section 100A includes an end cap 101 having a planar compression face 102, an annular flange 104, and an annular deformable finger section 106 from which tab fingers 106A extend. A central bore 108 is located intermediate to an upper cavity 109 and a lower cavity 110, the latter being circumscribed by the finger section 106. A deformable O-ring 120 is sized to fit in a recess 122 adjacent the annular flange 104. The recess 122 is formed in the compression face 102 that is located outboard of the annular flange 104.

In addition, the lower section 100B includes a deformable washer 130 having a central through-hole 132 that is sized to fit snugly on a rotor assembly 140. That is, the diameter of the through-hole 132 is sized such that the washer 130 slides over the vertical face 142F of a cylindrical axial projection 142, and the lower surface 134 of the washer 130 is designed to lie on the compression face 144F of a lateral shelf 144. The outer diameter of the vertical surface 142F is also constructed to fit snugly into the inner vertical surface 110F of the cavity 110.

A threaded screw 150 includes a threaded shank 150T that is sized for insertion through a flat washer 152 and then progressively through the recess 109, central bore 108, cavity 110, and 0-ring 120 until the flat washer 152 is seated in the upper recess 109. By positioning the 0-ring 120 in the recess 122, and the washer 130 on the rotor assembly 140, the optical disk may then be captured between the upper and lower sections 100A and 100B as the threaded screw 150 is seated in the central bore 146.

The end cap 101 is preferably formed of a substantially rigid material which nonetheless is subject to flexure in the finger portion 106. The finger tabs 106A are then subject to slight movement inward as they enter the aperture 27 of the optical disk 36. The tabs 106A, being equidistant from the axis 152 and equally deformable, will thus snugly co-locate the end cap 101 and 0-ring 120 to be precisely coaxial with the central aperture 27 of the optical disk, and the rotor assembly 140 is similarly made coaxial with the central axis 33 of the aperture 27 as the upper and lower section 100A and 100B are joined.

In a fashion similar to that described with reference to the first preferred embodiment 50, the tabs 106A are automatically interposed between the inner surface 27F and the vertical surface 142F of the rotor assembly 140.

The O-ring 120, being interposed between the upper surface of the optical disk 36LL and the face 102 of the end cap 101, is compressed as the upper and lower sections 100A and 100B are assembled. Similarly, the washer 130 is interposed and compressed between the lower surface 36L of the optical disk 36 and the compression face 144F of the shelf 144.

The optical disk is thereby captured securely while all surfaces of the disk that meet any portion of the disk mount are soft-mounted, and accordingly the yield stress of the disk surface is preserved.

The rotor assembly includes an armature rod 148 and concentric magnetized section 149. The armature (not shown) rod 148 is sized to fit in a known motor drive apparatus for rotating the mount 100. The magnetized section 150 includes alternating magnetic pole pieces N and S distributed evenly around the armature rod 148. In the presence of an appropriately changing magnetic field provided by the motor drive apparatus, the magnetic pole pieces N and S are subjected to a force component tangential to the axis 152 so as to cause the rotor assembly to rotate about axis 152.

The magnetized section 150 is preferably formed from a moldable composition that is formed in the rotor assembly and then subjected to a localized magnetizing field so as to permanently magnetize the pole pieces N and S. The moldable composition may, for example, includes a mixture of powdered hard magnetic material in a plastic binder. Such a composition, as well as other suitable means for integrating magnetic pole pieces in the rotor assembly 140, are known in the art.

Several components of the second preferred embodiment 100 are quite similar in composition to their counterparts in the first preferred embodiment 50, so as to perform largely the same functions. The end cap 101, tabs 106, 0-ring 120, and washer 130 are each formed from material already described with reference to the end cap 51, tabs 56A, O-ring 70, and washer 80, respectively, in the first preferred embodiment.

FIGS. 8 and 9A through 9C illustrate a third preferred embodiment 200 of a disk mount constructed according to the present invention. In the upper section 200A, an internally-threaded cap 202 includes a compression face 204 and a vertical face 206 against which a deformable 0-ring 210 may be seated. An interior cavity 208 is defined by the cap underside 208T and a threaded sidewall 208W. A grooved pattern 209 is preferably included in the underside 208T such that the underside may be used as a bearing surface in a conventional air bearing apparatus (not shown) in a manner to be described shortly.

The lower section 200B includes a threaded sleeve 220 which at one end includes a compression face 222 extending radially from the body of the sleeve 220. An adjacent cylindrical axial projection 224 extends coaxially from the compression face 22. The axial projection 224 includes an upper threaded portion 224T and a smooth lower section 224B. The smooth lower section 224B is sized to (firstly) receive a deformable flat washer 230, which will lie flat against the compression face 222, and (secondly) deformable bushing 232. The threaded section 224T is constructed to mesh with the threaded sidewall 208W in the threaded cap 202.

After placement of the O-ring 210 on the threaded cap 202, and the flat washer 230 and bushing 232 on the sleeve 220, the central aperture 27 of the optical disk may be seated on the washer 230 and bushing 232 such that the upper section 200A may be screwed down onto the axial projection 224. A predetermined amount of rotational torque may be applied to the threaded cap 202 by use of a hexagonal wrench or similar tool head (not shown) inserted in a respectively-shaped recess 240. The disk 36 is thereby securely and concentrically captured between the upper section 200A and the lower section 200B.

Thus, it is important to note that the optical disk 36, when soft-mounted according to the construction of the third embodiment 200, receives contact forces only from the O-ring 210, bushing 232, and flat washer 232, all of which are deformable to the extent that the yield strength of the optical disk is uncompromised. The O-ring 232 and flat washer 230 are therefore preferably formed of a deformable, high-friction coefficient material as was already described with respect to their counterparts in the first and second preferred embodiments. The bushing 232 may also be formed from a similarly deformable, high-friction coefficient material such as that used to form the flat washer 230. Alternatively, the bushing 232 may be formed from one or more layers of adhesive-backed deformable plastic tape that would be wrapped around the smooth lower section 224B of the projection 224. In a still further alternative, the functions of the bushing 232 and washer 230 may be provided by a single shoulder washer (not shown), whereupon the latter component would have dimensions and a composition derived from the combination of the two former components.

Once the disk 36 is captured, the disk mount 200 may be placed on suitable means in a rotational drive apparatus (not shown) as is known in the art such that the disk 36 and disk mount 200 are integrally rotatable by applying a rotational force to the sleeve 220 in a direction tangential to central axis 250. It is contemplated that the grooved pattern 209, at the cap underside 208T, will be supported by a suitable air bearing apparatus (not shown). The disk 36 and disk mount 200 may thereby be rotated as a unit in a friction-free fashion at a high speed without the threat of disk fracture.

The invention has been described in detail with particular reference to preferred embodiments thereof, but it will be understood that variations and modifications can be effected within the spirit and scope of the invention.

I claim:

1. Apparatus for soft mounting a rotatable optical disk having upper and lower surfaces and a central aperture therebetween defining an axis of rotation for the optical disk, comprising:
   first compression means having a central bore and a first compression face located circumjacent the central bore;
   second compression means having an axial projection extending therefrom, the axial projection coaxially engaged in the central bore, and a second compression face circumjacent the projection; and
   deformable means locatable between the first compression face and the upper surface, between the axial projection and the central aperture, and between the second compression face and the lower surface of the optical disk;
   wherein the first and second compression means are coaxially aligned with respect to the axis of rotation and the deformable means is capable of surface deformation sufficient to preserve yield stress of the optical disk.

2. The apparatus claimed in claim 1, further comprising means for fastening the first and second compression means upon the optical disk.

3. The apparatus claimed in claim 2, wherein the fastening means includes first and second sets of complementary machine threads on the central bore and the axial projection, respectively.

4. The apparatus claimed in claim 2, wherein the fastening means includes a threaded screw and the axial projection includes complementary machine threads, the screw being insertable through the central bore and the aperture for engagement with the machine threads on the axial projection.

5. The apparatus claimed in claim 1, wherein the deformable means further comprises an annular finger section located circumjacent the central bore, the finger section being operable to coaxially locate the upper section with respect to the axis of rotation.

6. The apparatus claimed in claim 1, wherein the deformable means further comprises a deformable O-ring locatable on the first compression face and a deformable flat washer locatable on the second compression face.

7. Apparatus for soft mounting a rotatable optical disk having upper and lower surfaces and a central aperture therein defining an axis of rotation for the optical disk, comprising:
   an upper section comprising first compression means having a central bore, first deformable means located circumjacent the bore and extending from the compression means, the first deformable means engaging the aperture and aligning the central bore to the axis of rotation, a first compression face located circumjacent the first deformable means, and second deformable means locatable on the first compression face; and
   a lower section comprising second compression means having an axial projection extending therefrom, the axial projection coaxially engaged in the central bore, a second compression face circumjacent the axial projection, and a third deformable means locatable on the second compression face;
   wherein the upper and lower sections are coaxially aligned with respect to the axis of rotation and the first, second, and third deformable means are capable of surface deformation sufficient to preserve yield stress of the optical disk.

8. The apparatus claimed in claim 7, further comprising means for fastening the upper and lower sections upon the optical disk.

9. The apparatus claimed in claim 8, wherein the fastening means includes first and second sets of complementary machine threads on the central bore and the axial projection, respectively.

10. The apparatus claimed in claim 8, wherein the fastening means includes a threaded screw and the axial projection includes complementary machine threads, the screw being insertable through the central bore and the aperture for engagement with the machine threads on the axial projection.

11. The apparatus claimed in claim 7, wherein the first deformable means further comprises an annular finger section.

12. The apparatus claimed in claim 7, wherein the second deformable means further comprises a deformable O-ring.

13. The apparatus claimed in claim 7, wherein the third deformable means further comprises a deformable flat washer.

14. Apparatus for soft mounting a rotatable optical disk having upper and lower surfaces and a central aperture therein defining an axis of rotation, comprising:

an upper section comprising an end cap having a central bore, an annular deformable finger section located circumjacent the bore and extending from the end cap, a first compression face located circumjacent the finger section, and a deformable O-ring locatable on the first compression face; and a lower section comprising second compression means having an axial projection extending therefrom, the axial projection coaxially engaged in the central bore for fastening the upper and lower sections on the disk in coaxial alignment with the axis of rotation, a second compression face located circumjacent the axial projection, and a deformable washer locatable on the second compression face;

wherein the annular deformable finger section, the O-ring, and washer frictionally capture the optical disk at the upper and lower surfaces and deform sufficiently to preserve yield stress of the optical disk.

* * * * *